(12) United States Patent
King et al.

(10) Patent No.: US 7,992,662 B2
(45) Date of Patent: *Aug. 9, 2011

(54) VEHICLE AND METHOD OF ASSEMBLING SAME

(75) Inventors: Robert Dean King, Schenectady, NY (US); Timothy Gerard Richter, Wynantskill, NY (US); John David Dubeck, Louisville, KY (US)

(73) Assignee: General Electric Company, Schenectady, NY (US)

( * ) Notice: Subject to any disclaimer, the term of this patent is extended or adjusted under 35 U.S.C. 154(b) by 1265 days.

This patent is subject to a terminal disclaimer.

(21) Appl. No.: 11/644,175

(22) Filed: Dec. 21, 2006

(65) Prior Publication Data

US 2007/0175681 A1 Aug. 2, 2007

Related U.S. Application Data

(60) Provisional application No. 60/759,918, filed on Jan. 18, 2006.

(51) Int. Cl.
  *B60K 1/00* (2006.01)
(52) U.S. Cl. ............................ 180/65.22; 180/65.235
(58) Field of Classification Search ............... 180/65.21, 180/65.22, 65.23, 65.235, 65.25, 65.26, 65.265, 180/65.28, 65.2; 701/22
  See application file for complete search history.

(56) References Cited

U.S. PATENT DOCUMENTS

| 2,205,999 | A | * | 6/1940 | Bartlett et al. | 248/639 |
| 5,415,603 | A | | 5/1995 | Tuzuki et al. | |
| 5,847,470 | A | * | 12/1998 | Mitchell | 290/45 |
| 5,873,426 | A | | 2/1999 | Tabata et al. | |
| 6,083,138 | A | | 7/2000 | Aoyama et al. | |
| 6,231,061 | B1 | * | 5/2001 | Cope | 280/124.111 |
| 6,962,545 | B2 | | 11/2005 | Larkin | |
| 7,086,977 | B2 | | 8/2006 | Supina et al. | |
| 7,090,613 | B2 | | 8/2006 | Heap et al. | |
| 7,147,072 | B2 | | 12/2006 | Botti | |
| 7,154,236 | B1 | | 12/2006 | Heap | |
| 7,182,167 | B2 | | 2/2007 | Sasamoto | |
| 7,190,133 | B2 | | 3/2007 | King et al. | |
| 7,628,236 | B1 | * | 12/2009 | Brown | 180/65.21 |
| 7,780,562 | B2 | * | 8/2010 | King et al. | 475/5 |
| 2002/0179350 | A1 | * | 12/2002 | Li | 180/65.3 |
| 2006/0000650 | A1 | * | 1/2006 | Hughey | 180/65.2 |

* cited by examiner

*Primary Examiner* — Jeffrey J Restifo
*Assistant Examiner* — Bridget Avery
(74) *Attorney, Agent, or Firm* — Armstrong Teasdale LLP

(57) ABSTRACT

A parallel hybrid vehicle includes a heat engine, a transmission including an input and an output, and an electrical device. The transmission input is coupled to the engine and the transmission output is coupled to the electrical device such that substantially all of the torque generated by the heat engine is channeled through the transmission to the electrical device, and a differential, the electrical device coupled to the differential such that during a first mode of operation the electrical device functions as a motor to receive substantially all the torque generated by the engine through the transmission, and such that during a second mode of operation the electrical device functions as a generator to receive substantially all the torque generated by the vehicle through the differential. A method of retrofitting a vehicle is also provided.

18 Claims, 10 Drawing Sheets

VEHICLE AND METHOD OF ASSEMBLING SAME

CROSS REFERENCE TO RELATED APPLICATIONS

This application claims the benefit of U.S. Provisional Application No. 60/759,918, filed Jan. 18, 2006.

BACKGROUND OF THE INVENTION

This invention relates generally to a vehicle propulsion system, and more specifically to a method and mounting system that is utilized to couple an electrical generator/motor utilized in the vehicle propulsion system to the vehicle.

FIG. 1 illustrates a known power train for a conventional vehicle, such as may be used in a Heavy Duty Truck or Bus. The conventional vehicle includes an internal combustion engine (ICE), a mechanical drive train to transmit the rotational torque and thus power from the engine through either a clutch and manual transmission arrangement or a torque converter and automatic transmission arrangement to the differential and drive wheels through one or more drive shafts and set(s) of universal joints.

Incorporated within the drive shaft assembly of a conventional vehicle is one or more slip joints, typically implemented via male and female spline components, to allow the effective length of the drive shaft to vary as the drive axle's suspension system travels through it's normal range. In addition, "carrier" bearings are required to support the weight of the drive shaft components and provide alignment for proper operation of the universal joints.

Moreover, as known, hybrid vehicles offer many advantages the foremost being fuel efficiency. However, hybrid vehicles also include additional components such as an electric drive system that works in combination with the internal combustion engine to achieve the fuel efficiency. Because of the increased complexity of known hybrid vehicles, the vehicles are generally manufactured such that the hybrid components are integrated with the engine system.

However, vehicle owners desiring to upgrade a conventional vehicle to include hybrid components may be precluded from doing so because of the cost and space required to modify a conventional vehicle to include an electric drive system. As a result, conventional vehicles may not achieve the fuel efficiency of a hybrid vehicle and thus may also not benefit from the reduced costs of operating the vehicle.

BRIEF DESCRIPTION OF THE INVENTION

In one aspect, a vehicle is provided. The vehicle includes a heat engine, a transmission including an input and an output, and an electrical device. The transmission input is coupled to the engine and the transmission output is coupled to the electrical device such that substantially all of the torque generated by the heat engine is channeled through the transmission to the electrical device, and a differential, the electrical device coupled to the differential such that during a first mode of operation the electrical device functions as a motor to receive substantially all the torque generated by the engine through the transmission, the transmission output torque is summed with the torque produced by the electric motor and transmitted to the differential and such that during a second mode of operation the electrical device functions as a generator to receive substantially all the torque generated by the vehicle through the differential.

In another aspect, a method of retrofitting a vehicle is provided. The vehicle includes a heat engine, a transmission coupled to the engine, a differential, and at least one drive shaft coupled between the transmission and the differential. The method includes removing the at least one drive shaft, and coupling an electric motor between the engine and the differential such that the electric motor receives substantially all of the torque generated by the engine and such that the differential receives substantially all the torque generated by the engine and the electric motor.

DETAILED DESCRIPTION OF THE INVENTION

Figure 1:
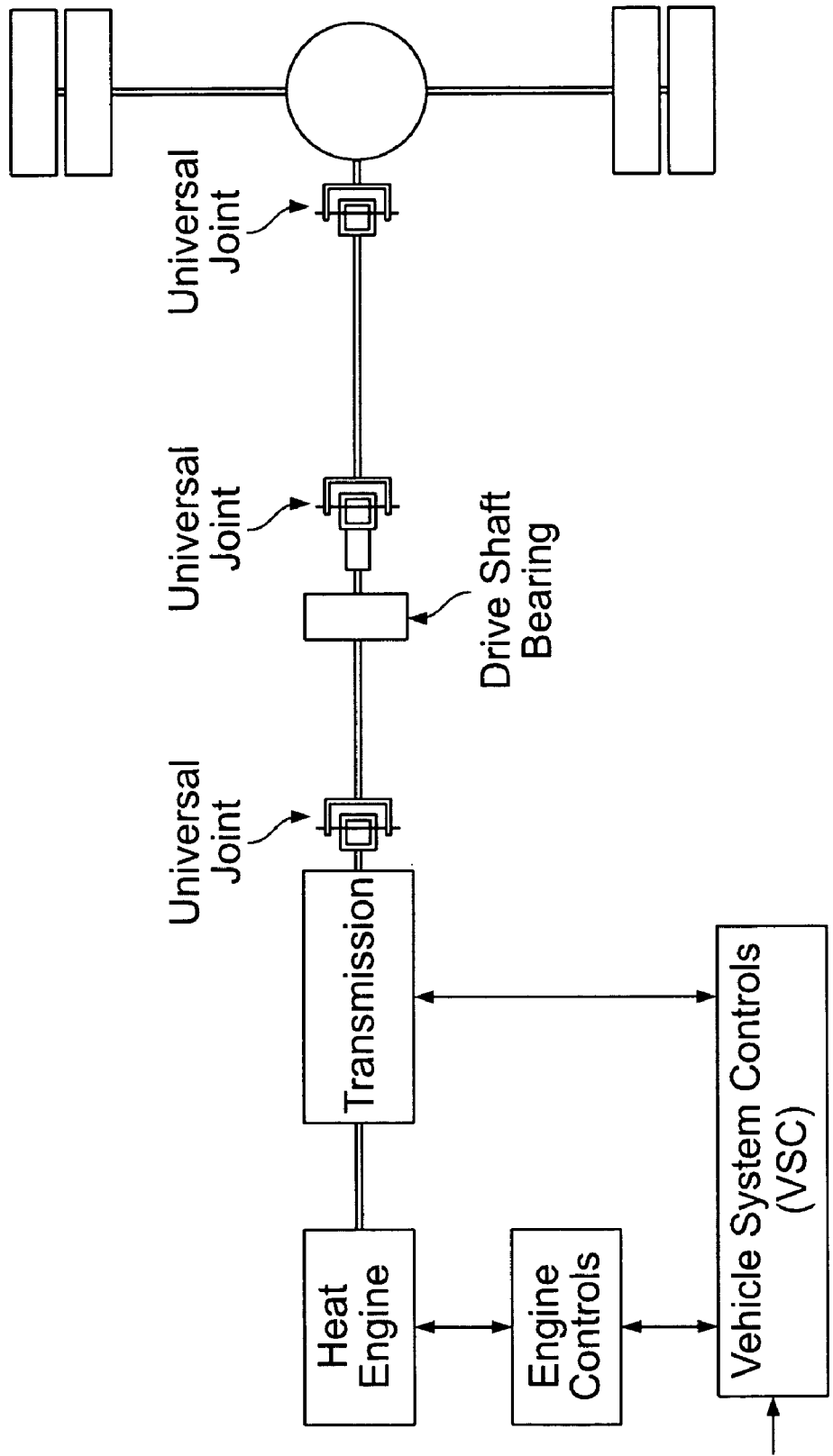
FIG. 1 illustrates a prior art power train used with a conventional vehicle.
Figure 2:
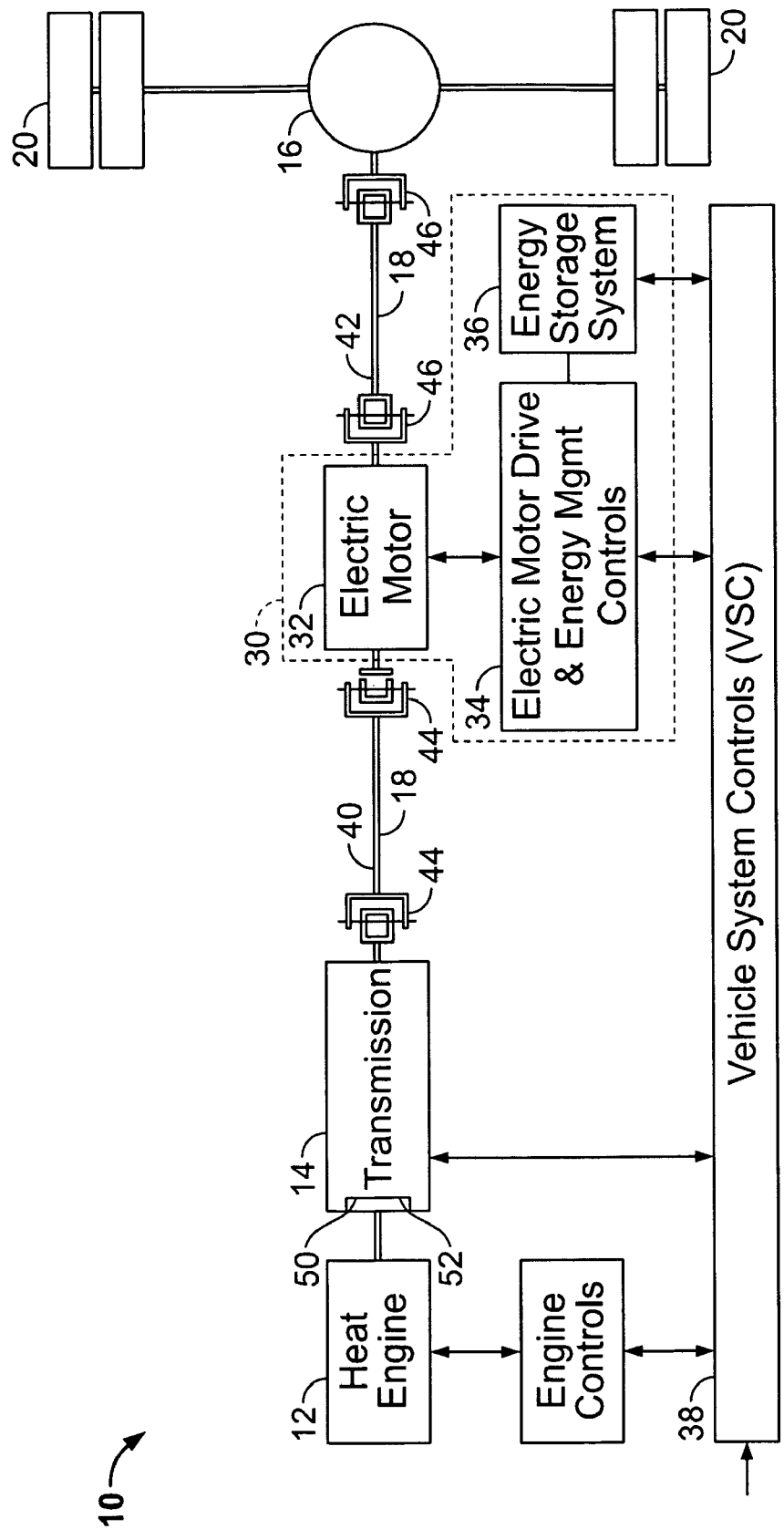
FIG. 2 is a schematic illustration of an exemplary hybrid vehicle that includes an electrical device.

FIG. 2 illustrates a vehicle 10 similar to the conventional vehicle shown in FIG. 1 that has been modified to include a hybrid drive system 30 that is discussed below. Vehicle as used herein represents any of a broad class of apparatuses that may be utilized to move an operator from a first location to a second location, and may include for example, trucks, buses, automobiles, off-road vehicles, etc. Vehicle 10 includes a heat engine 12, a transmission 14 that is coupled to the engine 12, a differential 16, and at least one drive shaft 18 that is coupled between the transmission 14 and the differential 16. The vehicle 10 also includes at least two wheels 20 that are coupled to respective ends of the differential 16. In one embodiment, vehicle 10 is configured as a rear wheel drive vehicle such that the differential is positioned near the aft end of vehicle 10 and therefore configured to drive at least one of the wheels 20. Optionally, vehicle 10 may configured as a front wheel drive vehicle.

In the exemplary embodiment, heat engine 12 may be implemented using at least one of an internal combustion gasoline engine, an internal combustion diesel engine, an external combustion engine, and a gas turbine engine.

As shown in FIG. 2, vehicle 10 also includes an exemplary hybrid drive system 30 that includes at least one electrical device 32 such as an electric motor/generator that is coupled between transmission 14 and differential 16, an Electric Motor Drive and Energy Management Controls System (EMDEMCS) 34 that is electrically coupled to electrical device 32, an energy storage system 36 that is coupled to the EMDEMCS 34, and a Vehicle System Controls (VSC) section 38 that is coupled to both the EMDEMCS 34, and the energy storage system 36. In the exemplary embodiment, the energy storage system comprises a plurality of batteries such as, but not limited to, sodium nickel chloride batteries, sodium sulfur batteries, sodium metal halide, a fuel cell, nickel metal hydride batteries, lithium ion batteries, lithium polymer batteries, nickel cadmium batteries, lead acid batteries that are coupled together in a serial or parallel arrangement, and/or ultracapacitor energy storage units.

In one embodiment, the electrical device 32 is coupled directly to transmission 14, and vehicle 10 includes at least one drive shaft 18 to couple the electrical device 32 to the differential 16. In another embodiment, the electrical device 32 is coupled directly to the differential 16, and vehicle 10 includes at least one drive shaft 18 to couple the electrical device 32 to the transmission 14. In the exemplary embodiment, illustrated in FIG. 2, vehicle 10 includes a first drive shaft 40, a second drive shaft 42, and two pairs of universal joints 44 and 46 to facilitate coupling electrical device 32 between transmission 14 and differential 16.

Specifically, the first drive shaft 40 is coupled between the transmission 14 and the electrical device 32 using the first pair of universal joints 44, and the second drive shaft 42 is coupled between the electrical device 32 and the differential using the second pair of universal joints 46. As such, when the vehicle is operating in a first mode the electrical device 32 functions as a motor to receive substantially all the torque generated by the engine 12 through the transmission 14, the transmission output torque is summed with the torque produced by the electric motor and transmitted to the differential 16. During a second mode of operation the electrical device 32 functions as a generator to receive substantially all the torque generated by the vehicle 10 through the differential 16. The phrase substantially all the torque, as used herein, represents the nominal torque that is generated by the engine 12 or transmission 14 when operating the first mode or the nominal torque that is generated by differential 16 when operating in the second mode, without representing minor mechanical or electrical losses that occur in a typical system. For example, internal losses caused by bearings, friction, or etc.

Moreover, although the exemplary embodiment illustrates a vehicle that includes the electrical device 32 coupled between the transmission 14 and the differential 16, it should be realized that vehicle 10 may include a single wheeled axle for example that replaces differential 16. Accordingly, the electrical device 32 in the exemplary embodiment, is coupled between the driving portion, i.e. engine 12 coupled to the transmission 14 and the driven portion, i.e. differential 16 or a simple axle. Optionally, electrical device 32 includes a clutch (not shown) that may be utilized to decouple a portion of the electrical device 32 from the drivetrain during selected driving conditions. For example, when vehicle 10 is operating on a freeway for example, an operator may choose to declutch the electrical device 32 from the drive train to facilitate optimizing fuel efficiency. As such, the electrical device 32 may include a rotor shaft such that the electrical device 32 is still configured to transmit torque from the transmission 14 to the differential 16 as shown.

In one embodiment, transmission 14 is a manually operated transmission that includes a plurality of gears such that the input torque received from engine 12 is multiplied using the gear ratio(s) and transmitted to the electrical device 32. As such, the manual transmission includes a clutch 50. In another embodiment, transmission 14 is an automatic transmission having one or more discrete gear ratios and as such may include a torque converter 52. Optionally, transmission 14 is an automatically shifted manual transmission and includes clutch 50. In the exemplary embodiment, the automatic transmission has continuously variable gear ratios that vary between approximately 0.5 to 1 and approximately 5.0 to 1.

In the exemplary embodiment, system 30 performs at least some of the functions as the conventional Integrated Starter Generator (ISG) configuration shown in FIG. 2 including, but not limited to, providing additional boost torque and power to the mechanical powertrain during vehicle acceleration, and also provides a retarding torque and power during vehicle deceleration and while holding speed on a down-hill grade.

Figure 3:
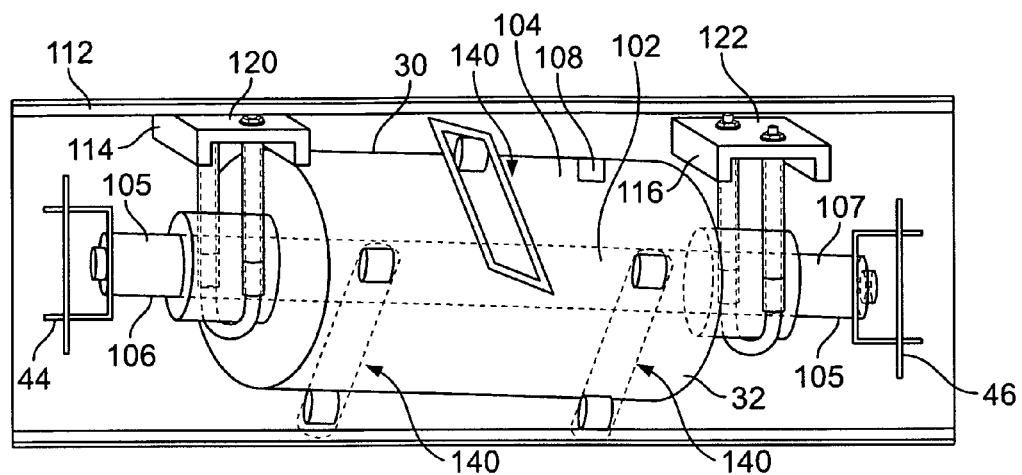
FIG. 3 is a side view of an exemplary sub-frame that may be utilized to mount the electrical device shown in FIG. 2 to the conventional vehicle shown in FIG. 1.
Figure 4:
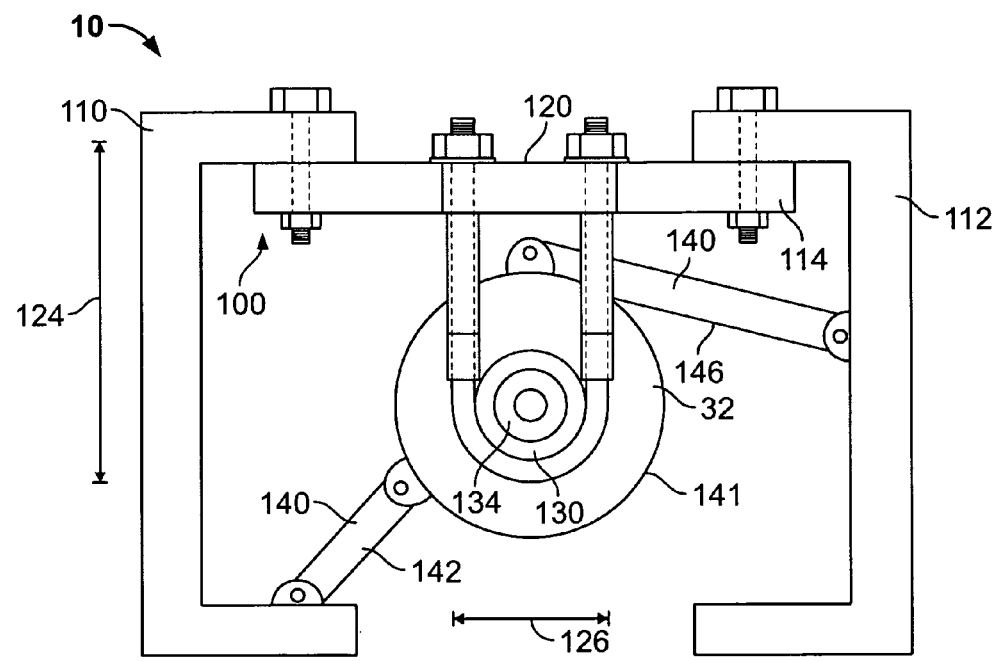
FIG. 4 is an end view of the sub-frame shown in FIG. 3.

FIG. 3 is a side view of an exemplary sub-frame assembly 100 that may be utilized to mount the electrical device 32 shown in FIG. 2 to the vehicle 10. FIG. 4 is an end view of sub-frame assembly 100. In the exemplary embodiment, electrical device 32 includes a rotor 102 and a stator 104. However, electrical device 32 may be any type of electrical machine, that performs function of a motor or a generator including, but not limited to, salient pole generators, double-sided stator generators, and/or doubly-fed induction generators. In the exemplary embodiment, rotor 102 includes a plurality of permanent magnets (not shown) that are coupled to rotor 102. Optionally, rotor 102 may be a wound rotor wherein the associated windings (not shown) are separately-excited, for example, but not limited to, a salient-pole rotor. In use, the stator windings generate a predetermined voltage within stator 104 at a predetermined frequency that is determined by the rotational speed of rotor 102 as rotor 102 is rotated within stator 104. The generated voltages within stator 104 subsequently generate a predetermined electric current within stator 104.

Rotor 102 includes a rotor shaft 105 that has a first end 106 that is coupled to universal joint 44 and a second end 107 that is coupled to universal joint 46. This arrangement is typically referred to as a "double-ended shaft" arrangement. In the exemplary embodiment, electrical device 32 also includes one or two bearings 108 generally located near each end of the rotor assembly. The motor bearing(s) with associated compliant motor mounting to sub-frame function as a "carrier" bearing in the conventional vehicle as shown in FIG. 1. Bearing 108 is disposed internally within motor/generator 32. During operation, when rotor 102 is driven by differential 16, electrical device 32 functions as a generator to produce electrical energy. Moreover, when rotor 102 is driven by transmission 14, electrical device 32 functions as a motor to drive differential 16 and thus propel vehicle 10.

Vehicle 10 includes a first frame rail 110 and a second frame rail 112 that are utilized to provide structural support for sub-frame assembly 100 and thus electrical device 32. For example, vehicle 10 includes a pair of frame rails 110 and 112 that are generally regarded as part of the vehicle chassis to which various components are mounted to form the vehicle, such as the engine, transmission, and axle, and vehicle body, for example. As such frame rails 110 and 112 are generally arranged parallel to each other and extend from approximately the vehicle front to approximately the vehicle rear. In the exemplary embodiment, frame rails 110 and 112 have a generally U-shaped or channel-shaped cross-sectional profile, as shown in FIG. 4. Optionally, frame rails 110 and 112 may have a substantially square or rectangular cross-sectional profile, generally known as boxed-in frame rails, without affecting the sub-frame assembly 100 described herein. During assembly sub-frame assembly 100 is coupled to frame rails 110 and 112 which provide structural support for electrical device 32.

Sub-frame assembly 100 includes a first cross-member 114 and a second cross-member 116. First and second cross-members 114 and 116 each extend between and are coupled to frame rails 110 and 112. As such, cross-members 114 and 116 are arranged generally perpendicular to frame rails 110 and 112. As shown in FIG. 3, cross-member 114 is disposed proximate to the forward end of electrical device 32, i.e. the end coupled to universal joint 44, and cross-member 116 is disposed proximate to the downstream end of electrical device 32, i.e. the end coupled to universal joint 46.

Sub-frame assembly 100 also includes a first motor mount 120 and a second motor mount 122 that are each utilized to couple electrical device 32 to a respective cross-member 114 and 116. More specifically, each motor mount 120 and 122 is fabricated from a combination of flexible or compliant material in a shape of concentric circles along with a metal bracket to provide both mechanical support for the electrical device 32 and to ensure that electrical device 32 remains aligned with the universal joints 44 and 46 and other associated drive shaft components. For example, in the first embodiment, the motor mount is comprised of two sub-assemblies. The first subassembly is a "U" shaped metal bracket that partially encircles a compliant ring concentrically mounted with the center line of the rotor shaft at each end of the motor frame. The "U" shaped metal support is coupled to cross-member 114 and/or 116 of the sub-frame and generally supports the mass of the electric motor 32. The compliant ring 134 may be fabricated from a rubber or other synthetic type of material. Each motor mount 120 and 122 has a length 124 and a width 126 that are sized to enable each respective motor mount 120 and 122 to at least partially circumscribe electrical device 32 and also be coupled to a respective cross-member 114 and/or 116. More specifically, electrical device 32 includes a first endbell 130 that is coupled to the forward end of electrical device 32 and a second endbell 132 that is coupled to the opposite end of electrical device 32. Each respective endbell has an opening extending therethrough that is sized to allow rotor shaft 105 to extend through each respective endbell such that rotor shaft 105 may be coupled to the universal joints, as described above. As such, each motor mount 120, 122 has a substantially U-shaped cross-sectional profile such that at least a portion of each motor mount 120, 122 at least partially circumscribes a respective endbell 130, 132 to support electrical device 32. As shown in FIG. 3, each respective motor mount 120, 122 is coupled to a respective cross-member 114, 116.

In the exemplary embodiment, sub-frame assembly 100 also includes a plurality of reaction torque elements 140 that are coupled between electrical device 32 and at least one respective frame rail 110 and/or 112. For example, as shown in FIGS. 3 and 4, sub-frame assembly 100 includes a first reaction torque member 142 that is coupled between electrical device 32 and frame rail 110, a second reaction torque member 144 that is coupled between electrical device 32 and frame rail 112, and a third reaction torque member 146 that is coupled between electrical device 32 and frame rail 112. In the exemplary embodiment, each respective reaction torque member 140 is coupled to the motor frame 141 and to either the frame rails or cross-members utilizing a plurality of brackets. Attachment points at each end of the reaction torque elements contain compliant bushings to minimize vibration transmitted to the sub-frame and thus the vehicle. Specifically, the reaction torque members 140 are connected from multiple points on the motor frame 141 to opposite sides of the motor sub-frame brackets that are attached to respective frame rails.

In the exemplary embodiment, reaction torque members 140 are positioned at approximately the 12:00 O'clock and 4:00 O'clock and 8:00 O'clock positions on the motor frame 141. Moreover, vertical mounting of the reaction members at the brackets on the sub-frame assembly 100 are attached at approximately the 2:00 O'clock and 4:00 O'clock and 8:00 O'clock positions at a height below the center of the rotor shaft 105 to minimize misalignment during high amplitude electric motor torque transients in either the positive and negative polarity.

During operation, the reaction torque members 140 allow for the bi-directional torque during all modes of operation, for example, from vehicle acceleration and deceleration. Moreover, mounting the reaction torque members 140 to either the frame rails 110, 112 or the cross-members 114, 116 compensates for any minimal misalignment between the electrical device 32 and the other components in the drive train that may occur during severe transient torque operation from maximum effort acceleration or panic stop braking events. Motor mounts 120 and 122 generally support the physical weight of electrical device 32 and associated rotor shaft 105, universal joints 44 and drive shafts 18. Furthermore, reaction torque members 140 reduce audible noise and vibration caused by the drive shaft components during operation of vehicle 10.

Figure 5:
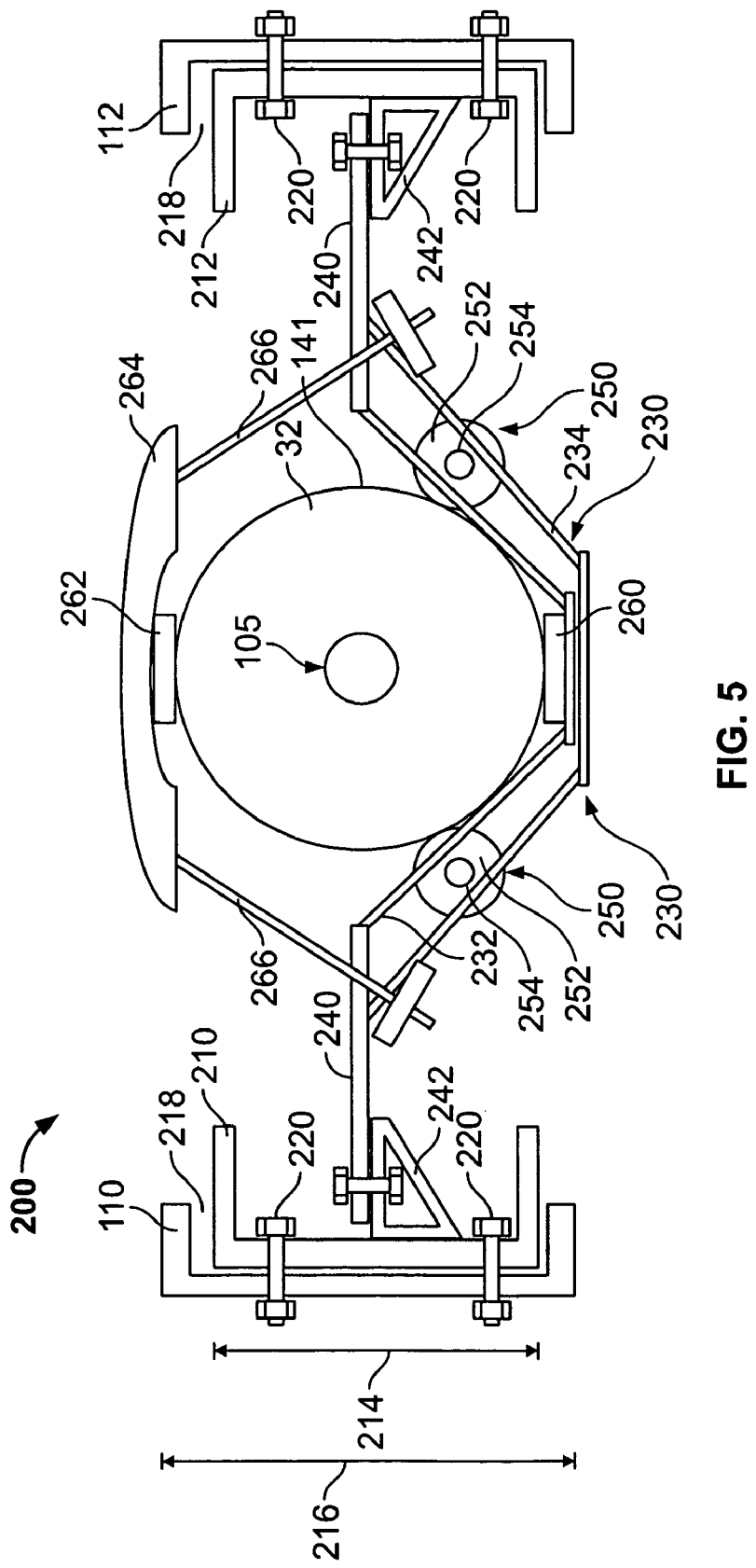
FIG. 5 is an end view of another exemplary sub-frame that may be utilized to mount the electrical device shown in FIG. 2 to the conventional vehicle shown in FIG. 2.

FIG. 5 is another exemplary sub-frame assembly 200 that may be utilized to mount the electrical device 32 shown in FIG. 2 to vehicle 10. As discussed above, vehicle 10 includes first frame rail 110 and second frame rail 112 that are utilized to provide structural support for sub-frame assembly 200 and thus electrical device 32. Specifically, sub-frame assembly 200 is coupled to frame rails 110 and 112 which provide structural support for electrical device 32. Moreover, sub-frame assembly 200 provides both mechanical support for the electrical device 32 and ensures that electrical device 32 remains aligned with the universal joints 44 and 46 and other associated drive shaft components (shown in FIG. 2).

Sub-frame assembly 200 includes a first sub-frame 210 and a second sub-frame 212. In the exemplary embodiment, each sub-frame 210 and 212 is fabricated from a metallic material and has a substantially C-shaped cross-sectional profile. More specifically, each sub-frame 210 and 212 has a width 214 that is less than a width 216 of frame rails 110 and 112, enabling each sub-frame 210 and 212 to be inserted at least partially into a cavity 218 formed by the cross-sectional profile of each respective frame rail 110 and 112. In the exemplary embodiment, each sub-frame 210 and 212 is coupled to a respective frame rail 110 and 112 utilizing a plurality of mechanical fasteners 220 such as bolts, for example. Optionally, each sub-frame 210 and 212 may be coupled to a respective frame rail 110 and 112 utilizing a welding or brazing procedure, for example.

Sub-frame assembly 200 also includes a support plate 230, which may also be referred to as a skid plate, that includes an upper portion 232 and a lower portion 234. In the exemplary embodiment, support plate 230 has a substantially V-shaped profile to facilitate constraining electrical device 32 in a lateral direction with respect to frame rails 110 and 112. Moreover, during operation, support plate 230 supports the weight of electrical device 32.

To secure support plate 230 to sub-frames 210 and 212, sub-frame assembly 200 also includes a pair of motor mounting brackets 240 and a pair of support brackets 242 having Δ-shaped cross-sectional profile. During assembly, motor mounting brackets 240 are coupled to opposite sides of support plate 230. In the exemplary embodiment, motor mounting brackets 240 are fastened to support plate 230 using a plurality of fasteners, such as bolts, for example. Optionally, motor mounting brackets 240 may be fastened to support plate 230 using a welding or brazing procedure, for example. As shown in FIG. 5, each respective support bracket 242 is coupled to a respective sub-frame 210 and 212. Each respective motor mounting bracket 240 is then positioned on a respective support bracket 242 such that support brackets 242 support the weight of electrical motor 32 and the additional components described above. Each respective motor mounting bracket 240 is coupled to a respective support bracket 242 using a plurality of mechanical fasteners, such as bolts, for example.

To facilitate limiting the movement of electrical device 32 in an axial direction, i.e. moving in the direction of rotation of rotor shaft 105, sub-frame assembly 200 also includes at least two motor mounts 250 are that coupled between electrical device 32 and support plate 230. More specifically, each motor mount 250 includes a compliant portion 252 that is secured to motor frame 141 using a mechanical fastener or adhesive, for example. Each compliant portion 252 has an opening 254 extending therethrough that is sized to receive a fastener (not shown). As such, the fasteners are utilized to secure each respective motor mount 250 to support plate 230. In operation, motor mounts 250 facilitate supporting electrical device 32 in combination with support plate 230. Moreover, motor mounts 250 substantially absorb any up or down movement of electrical device 32 that may occur when vehicle 10 experiences rapid movement, for example when vehicle 10 hits a pothole.

To provide additional support to electrical device 32, sub-frame assembly 200 may also include a first shock absorbing member 260 that is positioned between a lower surface of electrical device 32 and support plate 230, and a second shock absorbing member 262 that is positioned between an upper surface of electrical device 32 and a top motor restraint 264. In the exemplary embodiment, each of first and second shock absorbing members 260 and 262 are fabricated from a compliant material, such as rubber, to facilitate reducing shock related stresses to electrical device 32 that may occur when vehicle 10 hits a pothole, for example, and to also facilitate retaining electrical device 32 in a substantially fixed position with respect to the various drivetrain components discussed above. In the exemplary embodiment, top motor restraint 264 is coupled to support plate 230 using at least two tierods 266.

During operation, support plates 230, tierods 266, and top motor restraint 264 allow for bi-directional torque during all modes of operation, for example, during vehicle acceleration and deceleration. Moreover, mounting the support plates 230 to motor mounting brackets 240 compensates for any minimal misalignment between the electrical device 32 and the other components in the drive train that may occur during severe transient torque operation from maximum effort acceleration or panic stop braking events. Sub-frame assembly 200 supports the physical weight of electrical device 32 and associated rotor shaft 105, universal joints 44 and drive shafts 18 such that electrical device 32 is substantially suspended within sub-frame assembly 200. Furthermore, compliant portions 252 within support plates 230 provides for alignment and minimizes damping vibrations caused during operation of vehicle 10. Sub-assembly 200 reduces audible noise and vibration caused by the drive shaft components during operation of vehicle 10.

Figure 6:
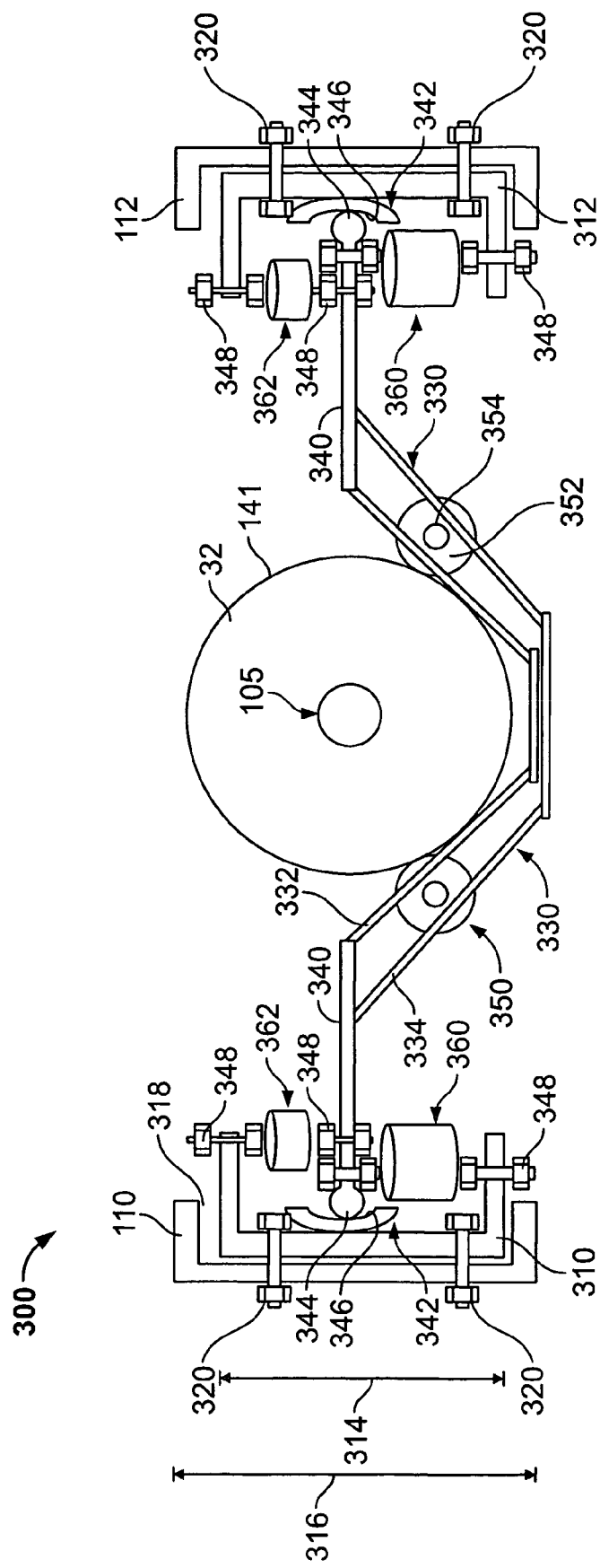
FIG. 6 is an end view of another exemplary sub-frame that may be utilized to mount the electrical device shown in FIG. 2 to the conventional vehicle shown in FIG. 2.

FIG. 6 is another exemplary sub-frame assembly 300 that may be utilized to mount the electrical device 32 shown in FIG. 2 to vehicle 10. As discussed above, vehicle 10 includes first frame rail 110 and second frame rail 112 that are utilized to provide structural support for sub-frame assembly 300 and thus electrical device 32. Specifically, sub-frame assembly 300 is coupled to frame rails 110 and 112 which provide structural support for electrical device 32. Moreover, sub-frame assembly 300 provides both mechanical support for the electrical device 32 and ensures that electrical device 32 remains aligned with the universal joints 44 and 46 and other associated drive shaft components (shown in FIG. 2).

Sub-frame assembly 300 is substantially similar to sub-frame assembly 200 shown in FIG. 5. In this embodiment, sub-frame assembly 300 also includes a first subassembly 310 and a second subassembly 312. In the exemplary embodiment, each subassembly 310 and 312 is fabricated from a metallic material and has a substantially C-shaped cross-sectional profile. More specifically, each subassembly 310 and 312 has a width 314 that is less than a width 316 of frame rails 110 and 112, to enable each subassembly 310 and 312 to be inserted at least partially into a cavity 318 formed by the cross-sectional profile of each respective frame rail 110 and 112. In the exemplary embodiment, each subassembly 310 and 312 is coupled to a respective frame rail 110 and 112 utilizing a plurality of mechanical fasteners 320 such as bolts, for example. Optionally, each subassembly 310 and 312 may be coupled to a respective frame rail 110 and 112 utilizing a welding or brazing procedure, for example.

Sub-frame assembly 300 also includes a support plate 330, which may also be referred to as a skid plate, that includes an upper portion 332 and a lower portion 334. In the exemplary embodiment, support plate 330 has a substantially V-shaped profile to facilitate constraining electrical device 32 in a lateral direction with respect to frame rails 110 and 112. Moreover, during operation, support plate 330 supports the weight of electrical device 32.

To secure support plate 330 to subassemblies 310 and 312, sub-frame assembly 300 also includes a pair of motor mounting brackets 340 and a pair of support brackets 342 having a C-shaped cross-sectional profile. Each bracket 342 has a sliding element 344 that is configured to slide along an interior surface 346 of each bracket 342. In the exemplary embodiment, sliding element 344 is a ball positioned adjacent interior surface 346 of each support bracket 342. In an alternative embodiment, sliding element 344 is any other suitable element that facilitates sliding along interior surfaces 346. During assembly, motor mounting brackets 340 are coupled to opposing sides of support plate 330. In the exemplary embodiment, motor mounting brackets 340 are fastened to support plate 330 using a plurality of fasteners (not shown), such as bolts, for example. Optionally, motor mounting brackets 340 may be fastened to support plate 330 using a welding or brazing procedure, for example. As shown in FIG. 6, each respective support bracket 342 is coupled to a respective subassembly 310 and 312. Sliding elements 344 are then coupled to each respective interior surface 346 of support brackets 342. Each respective motor mounting bracket 340 is then coupled to respective sliding elements 344. Support brackets 342 and rolling elements 344 facilitate retaining electrical device 32 in a substantially fixed lateral position with respect to the various drivetrain components discussed above.

To facilitate limiting the movement of electrical device 32 in an axial direction, i.e. moving in the direction of rotation of rotor shaft 105, sub-frame assembly 300 also includes at least two motor mounts 350 are that coupled between electrical device 32 and support plate 330. More specifically, each motor mount 350 includes a compliant portion 352 that is secured to motor frame 141 using a mechanical fastener or adhesive, for example. Each compliant portion 352 has an opening 354 extending therethrough that is sized to receive a fastener, not shown. As such, the fasteners are utilized to secure each respective motor mount to support plate 330. In operation, motor mounts 350 facilitate supporting electrical device 32 in combination with support plate 330. Moreover, motor mounts 350 substantially absorb any up or down movement of electrical device 32 that may occur when vehicle 10 experiences rapid movement, for example when vehicle 10 hits a pothole.

To provide additional support to electrical device 32, sub-frame assembly 300 may also include a pair of first shock absorbing members 360 and a pair of second shock absorbing members 362. Each first shock absorbing member 360 is positioned between subassemblies 310 and 312 and a lower surface of motor mounting bracket 340. Each second shock absorbing member 362 is positioned between subassemblies 310 and 312 and an upper surface of motor mounting bracket 340. In the exemplary embodiment, each first and second shock absorbing members 360 and 362 are coupled between subassemblies 310 and 312 and motor mounting brackets 340 using a plurality of mechanical fasteners 348, such as bolts, for example. In the exemplary embodiment, each of first and second shock absorbing members 360 and 362 is fabricated from a compliant material, such as rubber, to facilitate reducing shock related stresses to electrical device 32 that may occur when vehicle 10 hits a pothole, for example. Specifically, in the exemplary embodiment, first shock absorbing members 360 are sized to support the weight of electrical device 32, and second shock absorbing members 362 are sized to absorb reaction torque and associated force.

During operation, support plates 330 and motor mounting bracket 340 of sub-frame assembly 300 allow for bi-directional torque during all modes of operation, for example, during vehicle acceleration and deceleration. Moreover, coupling support plates 330 to motor mounting brackets 340 compensates for any minimal misalignment between the electrical device 32 and the other components in the drive train that may occur during severe transient torque operation from maximum effort acceleration or panic stop braking events. Specifically, support brackets 342 and sliding elements 344 allow for the bi-directional torque such that sliding elements 344 slide along interior surfaces 346 of brackets 342. Sub-frame assembly 300 supports the physical weight of electrical device 32 and associated rotor shaft 105, universal joints 44 and drive shafts 18 such that electrical device 32 is substantially suspended within sub-frame assembly 300. Furthermore, compliant portions 360 and 362 minimize damping vibrations caused during operation of vehicle 10 such that audible noise caused by the drive shaft is reduced.

Figure 7:
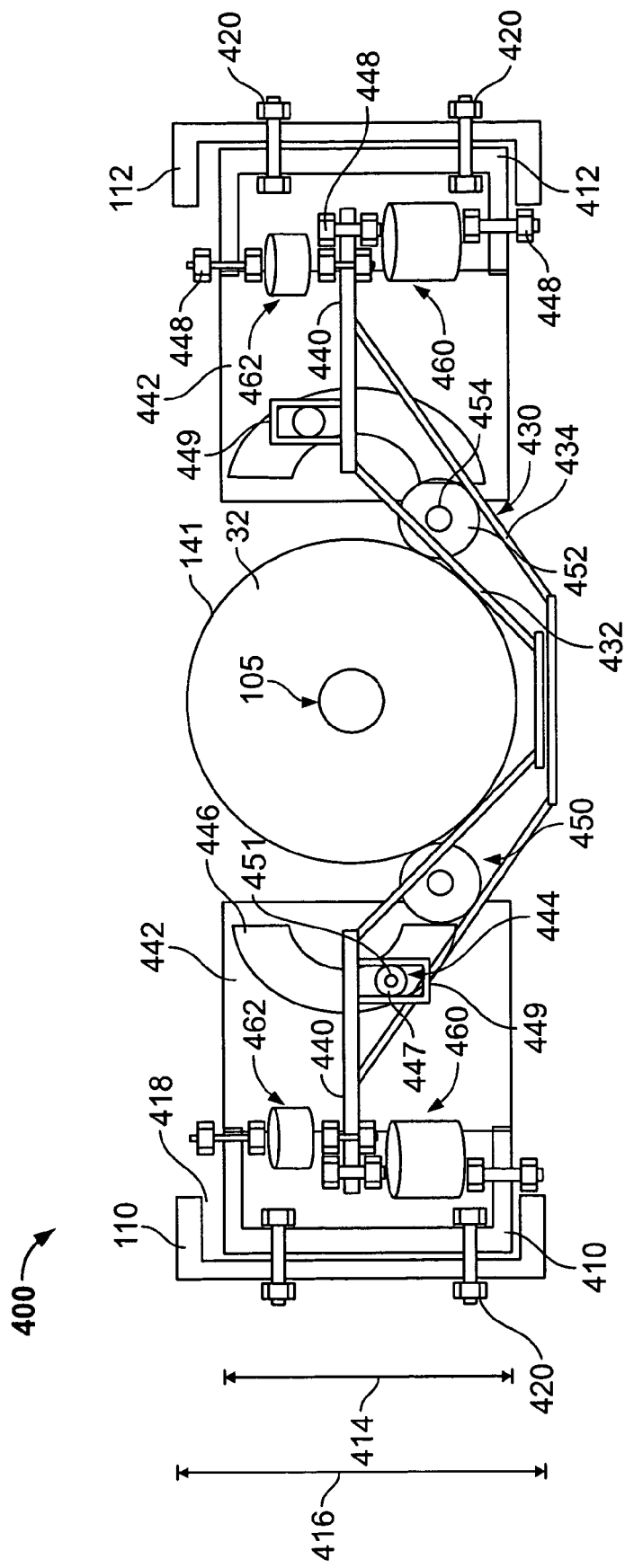
FIG. 7 is an end view of another exemplary sub-frame that may be utilized to mount the electrical device shown in FIG. 2 to the conventional vehicle shown in FIG. 2.

FIG. 7 is another exemplary sub-frame assembly 400 that may be utilized to mount the electrical device 32 shown in FIG. 2 to vehicle 10. As discussed above, vehicle 10 includes first frame rail 110 and second frame rail 112 that are utilized to provide structural support for sub-frame assembly 400 and thus electrical device 32. Specifically, sub-frame assembly 400 is coupled to frame rails 110 and 112 which provide structural support for electrical device 32. Moreover, sub-frame assembly 400 provides both mechanical support for the electrical device 32 and ensures that electrical device 32 remains aligned with the universal joints 44 and 46 and other associated drive shaft components (shown in FIG. 2).

Sub-frame assembly 400 is substantially similar to sub-frame assembly 300 shown in FIG. 6. In this embodiment, sub-frame assembly 400 also includes a first subassembly 410 and a second subassembly 412. In the exemplary embodiment, sub-frame assembly 400 supports the physical weight of electrical device 32 and associated rotor shaft 105, universal joints 44 and drive shafts 18 such that electrical device 32 is substantially suspended within sub-frame assembly 400. In the exemplary embodiment, each subassembly 410 and 412 is fabricated from a metallic material and has a substantially C-shaped cross-sectional profile. More specifically, each subassembly 410 and 412 has a width 414 that is less than a width 416 of frame rails 110 and 112, to enable each subassembly 410 and 412 to be inserted at least partially into a cavity 418 formed by the cross-sectional profile of each respective frame rail 110 and 112. In the exemplary embodiment, each subassembly 410 and 412 is coupled to a respective frame rail 110 and 112 utilizing a plurality of mechanical fasteners 420 such as bolts, for example. Optionally, each subassembly 410 and 412 may be coupled to a respective frame rail 110 and 112 utilizing a welding or brazing procedure, for example.

Sub-frame assembly 400 also includes a support plate 430, which may also be referred to as a skid plate, that includes an upper portion 432 and a lower portion 434. In the exemplary embodiment, support plate 430 has a substantially V-shaped profile to facilitate constraining electrical device 32 in a lateral direction with respect to frame rails 110 and 112. Moreover, during operation, support plate 430 supports the weight of electrical device 32.

To secure support plate 430 to subassemblies 410 and 412, sub-frame assembly 400 also includes a pair of motor mounting brackets 440, and a pair of plates 442 having a C-shaped cross-sectional slot 446 formed within each plate 442. Each plate 442 is coupled to and extends from subassemblies 410 and 412. Each mounting bracket 440 includes a bracket housing 449 that extends outward from brackets 440. In the exemplary embodiment, housing 449 for first subassembly 410 extends downward from bracket 440, and housing 449 for second subassembly 412 extends upward from bracket 440. Housing 449 for second subassembly 412 extends in an opposing direction than housing 449 for first subassembly 410.

Each housing 449 includes a sliding element 444. Each sliding element 444 is configured to slide within slot 446 defined within plate 442. In the exemplary embodiment, each sliding element 444 includes a compliant portion 447 that is secured within housing 449. Moreover, each sliding element 444 has an opening 451 extending therethrough that is sized to receive a fastener, not shown. In operation, sliding elements 444 facilitate bi-directional reaction torque while providing for proper alignment of universal joints 44 and drive shafts 18.

During assembly, motor mounting brackets 440 including bracket housings 449 are coupled to opposing sides of support plate 430. In the exemplary embodiment, motor mounting brackets 440 are fastened to support plate 430 using a plurality of fasteners (not shown), such as bolts, for example. Optionally, motor mounting brackets 440 may be fastened to support plate 430 using a welding or brazing procedure, for example. As shown in FIG. 7, each respective sliding element 444 is coupled within respective slots 446 of plate 442.

To facilitate limiting the movement of electrical device 32 in an axial direction, i.e. moving in the direction of rotation of rotor shaft 105, sub-frame assembly 400 also includes at least two motor mounts 450 are that coupled between electrical device 32 and support plate 430. More specifically, each motor mount 450 includes a compliant portion 452 that is secured to motor frame 141 using a mechanical fastener or adhesive, for example. Each compliant portion 452 has an opening 454 extending therethrough that is sized to receive a fastener, not shown. As such, the fasteners are utilized to secure each respective motor mount to support plate 430. In operation, motor mounts 450 facilitate supporting electrical device 32 in combination with support plate 430. Moreover, motor mounts 450 substantially absorb any up or down movement of electrical device 32 that may occur when vehicle 10 experiences rapid movement, for example when vehicle 10 hits a pothole.

To provide additional support to electrical device 32, sub-frame assembly 400 may also include a pair of first shock absorbing members 460 and a pair of second shock absorbing members 462. Each first shock absorbing member 460 is positioned between subassemblies 410 and 412 and a lower surface of motor mounting bracket 440. Each second shock absorbing member 462 is positioned between subassemblies 410 and 412 and an upper surface of motor mounting bracket 440. In the exemplary embodiment, each first and second shock absorbing members 460 and 462 are coupled between subassemblies 410 and 412 and motor mounting brackets 440 using a plurality of mechanical fasteners 448, such as bolts, for example. In the exemplary embodiment, each of first and second shock absorbing members 460 and 462 is fabricated from a compliant material, such as rubber, to facilitate reducing shock related stresses to electrical device 32 that may occur when vehicle 10 hits a pothole, for example, and to also facilitate retaining electrical device 32 in a substantially fixed lateral position with respect to the various drivetrain components discussed above. Specifically, in the exemplary embodiment, first shock absorbing members 460 are sized to support the weight of electrical device 32, and second shock absorbing members 462 are sized to absorb reaction torque and associated force.

During operation, support plates 430 and motor mounting bracket 440 of sub-frame assembly 400 allow for bi-directional torque during all modes of operation, for example, during vehicle acceleration and deceleration. Moreover, coupling support plates 430 to motor mounting brackets 440 and mounting sub-frame assembly 400 to frame rails 110, 112 compensates for any minimal misalignment between the electrical device 32 and the other components in the drive train that may occur during severe transient torque operation from maximum effort acceleration or panic stop braking events. Specifically, sliding elements 444 in slots 446 allow for the bi-directional torque resulting from vehicle acceleration such that sliding elements 444 slide within slots 446. Furthermore, compliant portions 460 and 462 minimize damping vibrations caused during operation of vehicle 10 such that audible noise caused by the drive shaft is reduced.

Figure 8:
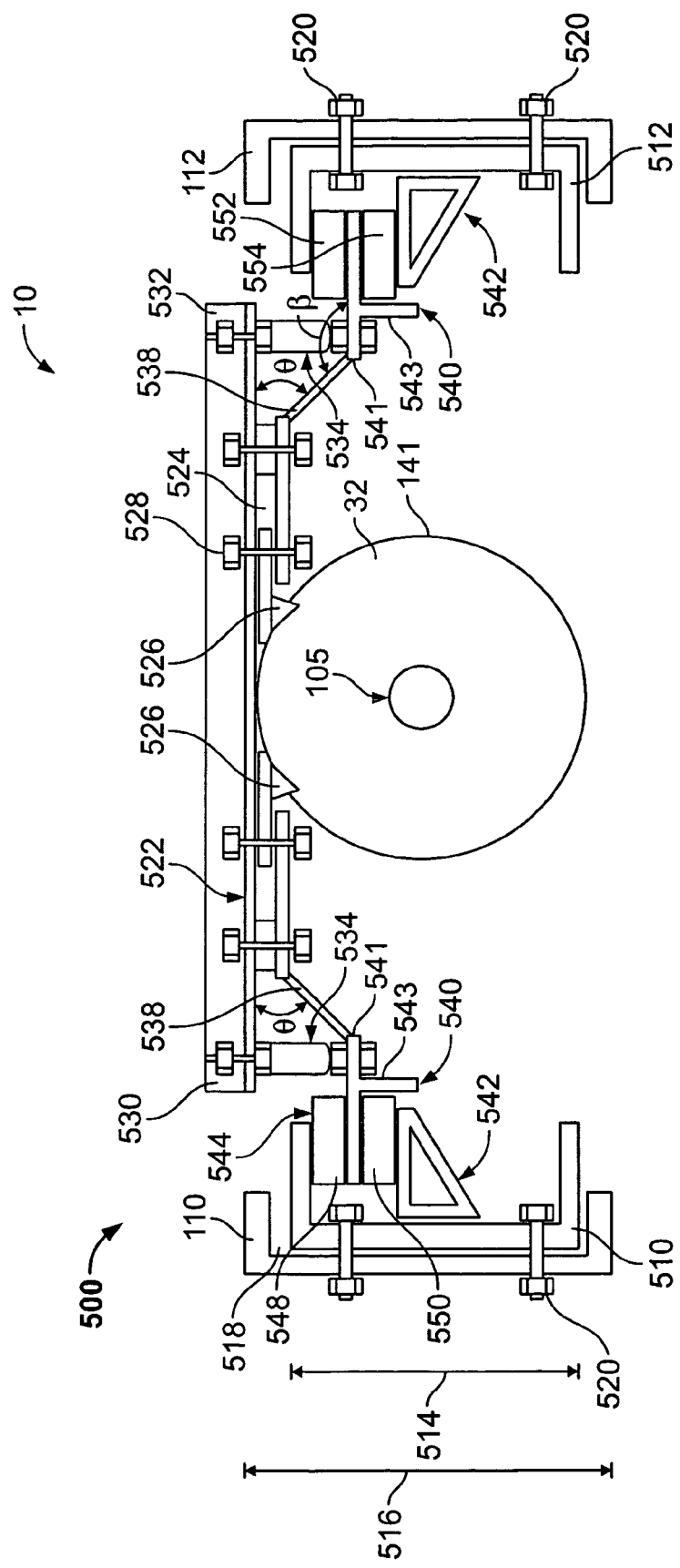
FIG. 8 is an end view of another exemplary sub-frame that may be utilized to mount the electrical device shown in FIG. 2 to the conventional vehicle shown in FIG. 2.

FIG. 8 is another exemplary sub-frame assembly 500 that may be utilized to mount the electrical device 32 shown in FIG. 2 to vehicle 10. As discussed above, vehicle 10 includes first frame rail 110 and second frame rail 112 that are utilized to provide structural support for sub-frame assembly 500 and thus electrical device 32. Specifically, sub-frame assembly 500 is coupled to frame rails 110 and 112 which provide structural support for electrical device 32. Moreover, sub-frame assembly 500 provides both mechanical support for the electrical device 32 and ensures that electrical device 32 remains aligned with the universal joints 44 and 46 and other associated drive shaft components (shown in FIG. 2).

Sub-frame assembly 500 is substantially similar to sub-frame assembly 400 shown in FIG. 7. In this embodiment, sub-frame assembly 500 also includes a first subassembly 510 and a second subassembly 512. In the exemplary embodiment, each subassembly 510 and 512 is fabricated from a metallic material and has a substantially C-shaped cross-sectional profile. More specifically, each subassembly 510 and 512 has a width 514 that is less than a width 516 of frame rails 110 and 112, to enable each subassembly 510 and 512 to be inserted at least partially into a cavity 518 formed by the cross-sectional profile of each respective frame rail 110 and 112. In the exemplary embodiment, each subassembly 510 and 512 is coupled to a respective frame rail 110 and 112 utilizing a plurality of mechanical fasteners 520 such as bolts, for example. Optionally, each subassembly 510 and 512 may be coupled to a respective frame rail 110 and 112 utilizing a welding or brazing procedure, for example.

Sub-frame assembly 500 also includes a pair of support brackets 542 having Δ-shaped cross-sectional profile coupled to respective subassemblies 510 and 512. Sub-frame assembly 500 also includes a motor mounting bracket 522 that extends along an upper portion of electrical device 32 to facilitate constraining electrical device 32 in a lateral direction with respect to frame rails 110 and 112. In the exemplary embodiment, motor mounting bracket 522 is coupled to the upper portion of electrical device 32 such that motor mounting bracket 522 may support the weight of electrical device 32. Sub-frame assembly 500 provides more ground clearance than other known assemblies. In the exemplary embodiment, motor mounting bracket 522 includes an effective slot 524 that is sized to receive a pair of motor mounting feet 526 integrally formed with motor frame 141. Motor mounting feet 526 are coupled to motor mounting bracket 522 with a plurality of fasteners 528, such as bolts, for example.

Moreover, motor mounting bracket 522 has a first end 530 and a second end 532. Motor mounting bracket 522 also includes a pair of angular portions 538 wherein each angular portion 538 extends outward from a portion of mounting bracket 522 at an angle θ. In the exemplary embodiment, angle θ is an acute 45° angle. A pair of lateral motion restraints 540 having a substantially T-shaped cross-sectional profile extend outward from angular portions 538. Specifically, each later restraint 540 has a first and second portion 541 and 543. In the exemplary embodiment, first portion 541 extends outward from angular portion 538 at an angle β. In the exemplary embodiment, angle β is an obtuse angle. Second portion 543 is substantially perpendicular to first portion 541. Restraints 540 facilitate reducing shock related stresses to electrical device 32 that may occur when vehicle 10 hits a pothole, for example, and to also facilitate retaining electrical device 32 in a substantially fixed lateral position with respect to the various drivetrain components discussed above.

In the exemplary embodiment, sub-frame assembly 500 includes a pair of compliant portions 534. At least one compliant portion 534 extends between first end 530 of motor mounting bracket 522 and first portion 541 of restraint 540, and at least one compliant portion 534 extends between second end 532 of motor mounting bracket 522 and first portion 541 of restraint 540. In the exemplary embodiment, compliant portions 534 are secured to bracket 522 and restraint 540 using a mechanical fastener or adhesive, for example.

To facilitate limited movement of electrical device 32 in a longitudinal direction, i.e. moving in the direction of front to back of vehicle 10, a pair of slide mount assemblies 544 are coupled to first portion 541 of restraints 540. Specifically, mount assemblies 544 each include a pair of longitudinal bearings 546. A first longitudinal bearing 548 is coupled between subassembly 510 and first portion 541 of restraint 540, and a second longitudinal bearing 550 is coupled between bracket 542 and first portion 541 of restraint 540. Similarly, a first longitudinal bearing 552 is coupled between subassembly 512 and first portion 541 of restraint 540, and a second longitudinal bearing 554 is coupled between bracket 542 and first portion 541 of restraint 540. In the exemplary embodiment, the conventional slip-joint within the drive shaft assembly may be simplified and/or removed.

During operation, coupling motor mounting bracket 522 along an upper portion of electrical device 32 substantially suspends electrical device 32 by motor mounting feet 526. Sub-frame assembly 500 provides a significant amount of clearance between electrical device 32 and the ground underneath vehicle 10. During operation, complaint portions 534 and longitudinal bearings 548 and 550 of sub-frame assembly 500 allow for bi-directional torque and limited longitudinal movement during all modes of operation, for example, during vehicle acceleration and deceleration. Restraint 540 may move laterally during operation causing second portion 532 of restraint 540 to contact bracket 542. Furthermore, compliant portions 534 and longitudinal bearings 548 and 550 minimize damping vibrations caused during operation of vehicle 10 such that audible noise caused by the drive shaft is reduced. Moreover, mounting sub-frame assembly 500 to frame rails 110, 112 compensates for any minimal misalignment between the electrical device 32 and the other components in the drive train that may occur during severe transient torque operation from maximum effort acceleration or panic stop braking events.

Figure 9:
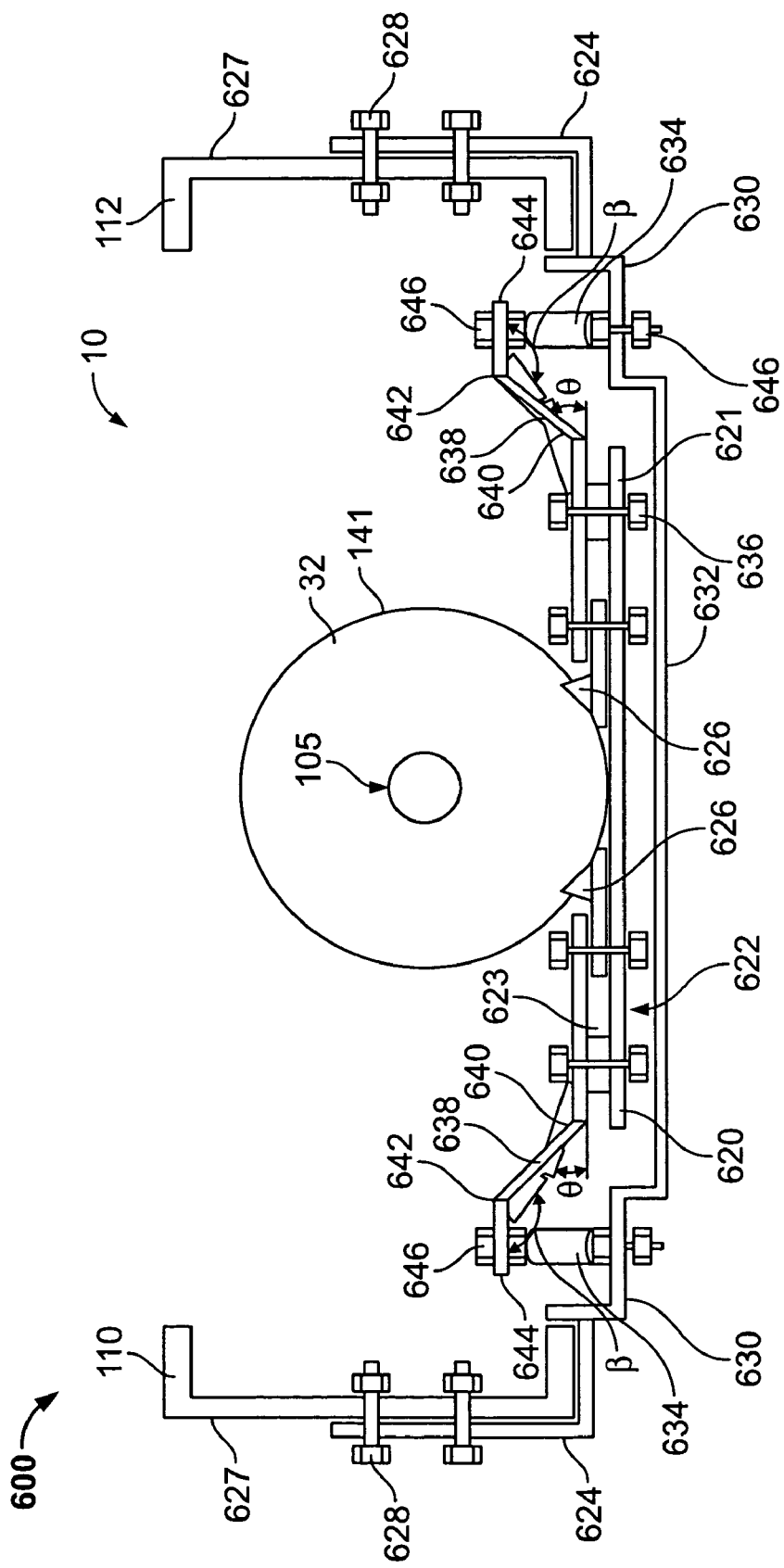
FIG. 9 is an end view of another exemplary sub-frame that may be utilized to mount the electrical device shown in FIG. 2 to the conventional vehicle shown in FIG. 2.

FIG. 9 is another exemplary sub-frame assembly 600 that may be utilized to mount the electrical device 32 shown in FIG. 2 to vehicle 10. As discussed above, vehicle 10 includes first frame rail 110 and second frame rail 112 that are utilized to provide structural support for sub-frame assembly 600 and thus electrical device 32. Specifically, sub-frame assembly 600 is coupled to frame rails 110 and 112 which provide structural support for electrical device 32. Moreover, sub-frame assembly 600 provides both mechanical support for the electrical device 32 and ensures that electrical device 32 remains aligned with the universal joints 44 and 46 and other associated drive shaft components (shown in FIG. 2).

Sub-frame assembly 600 is substantially similar to sub-frame assembly 500 shown in FIG. 8. In the exemplary embodiment, assembly 600 includes a pair of brackets 624. In the exemplary embodiment, each bracket 624 has a cross-sectional L-shape that is coupled to frame rails 110 and 112, respectively. Specifically, each bracket 624 is coupled to an exterior surface 627 of rails 110 and 112 with a plurality of fasteners 628, such as bolts, for example. In an alternative embodiment, each bracket 624 is welded to frame rails 110 and 112.

Moreover, in the exemplary embodiment, assembly 600 further includes a pair of brackets 630. In the exemplary embodiment, each bracket 630 has a cross-sectional L-shape. Each bracket 630 is coupled to brackets 624, respectively. Specifically, in the exemplary embodiment, each bracket 630 is welded to brackets 624. Assembly 600 further includes a bracket 632 coupled between the pair of brackets 624. In the exemplary embodiment, bracket 632 has a cross-sectional U-shape. In an alternative embodiment, bracket 632 has a different cross-sectional shape. In the exemplary embodiment, bracket 632 is configured to prevent electrical device 32 from falling to the ground. In the exemplary embodiment, brackets 624, 630, and 632 are welded together. In an alternative embodiment, brackets 624, 630, and 632 may be coupled together using any suitable method.

Assembly 600 also includes a motor mounting bracket 622 that extends along a lower portion of electrical device 32 to facilitate constraining electrical device 32 in a lateral direction with respect to frame rails 110 and 112. Motor mounting bracket 622 is positioned a distance away from bracket 632. Moreover, during operation, motor mounting bracket 622 may support the weight of electrical device 32. Motor mounting bracket 622 includes a first end 620, an opposing second end 621, and a slot 623 extending therebetween. Slot 623 is sized to receive a pair of motor mounting feet 626 that are coupled to motor frame 141. Motor mounting feet 626 are coupled to motor mounting bracket 622 with a plurality of fasteners 628, such as bolts, for example.

Moreover, motor mounting bracket 622 also includes a pair of angular portions 638 extending outward from a portion of mounting bracket 622. Each angular portion 638 includes a first end 640 and an opposing second end 642. Specifically, first ends 640 of angular portions 638 extend from first and second ends 620 and 621 of bracket 622. In the exemplary embodiment, angular portions 638 and ends 620 and 621, respectively, form an angle θ. In the exemplary embodiment, angle θ is approximately a 45° angle. In an alternative embodiment, angle θ is any suitable angle. Sub-frame assembly 600 also includes a pair of horizontal members 644. Each horizontal member 644 extends outward from second ends 642 of angular portions 638 at angle β. In the exemplary embodiment, angle β is an obtuse angle.

In the exemplary embodiment, sub-frame assembly 600 includes a pair of compliant portions 634. Each compliant portion 634 is coupled between horizontal members 644 and brackets 630. Compliant portions 634 compensate for any minimal misalignment. A plurality of fasteners 646 are used to couple compliant portions 634 between members 644 and brackets 660. Fasteners 646 may be a mechanical fastener or adhesive, for example.

During operation, coupling motor mounting bracket 622 along a lower portion of electrical device 32 supports the weight of electrical device 32. Bracket 622 facilitates retaining electrical device 32 in a substantially fixed lateral position with respect to the various drivetrain components discussed above, and bracket 632 prevents electrical device 32 from falling to the ground should bracket 622 fail. Complaint portions 634 of sub-frame assembly 600 allow for bi-directional torque during all modes of operation, for example, during vehicle acceleration and deceleration. Furthermore, compliant portions 634 minimize damping vibrations caused during operation of vehicle 10 such that audible noise caused by the drive shaft is reduced. Compliant portions 634 facilitate reducing shock related stresses to electrical device 32 that may occur when vehicle 10 hits a pothole, for example. Moreover, mounting sub-frame assembly 600 to frame rails 110, 112 compensates for any minimal misalignment between the electrical device 32 and the other components in the drive train that may occur during severe transient torque operation from maximum effort acceleration or panic stop braking events.

Figure 10:
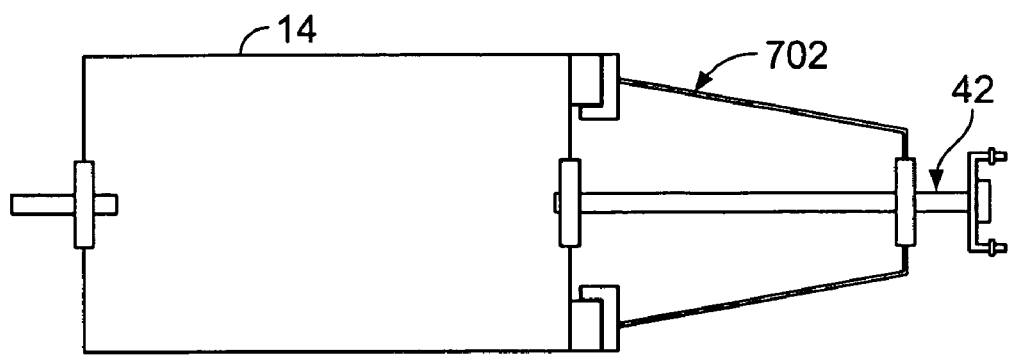
FIG. 10 is a schematic illustration of a prior art transmission and assembly used with a conventional vehicle.
Figure 11:
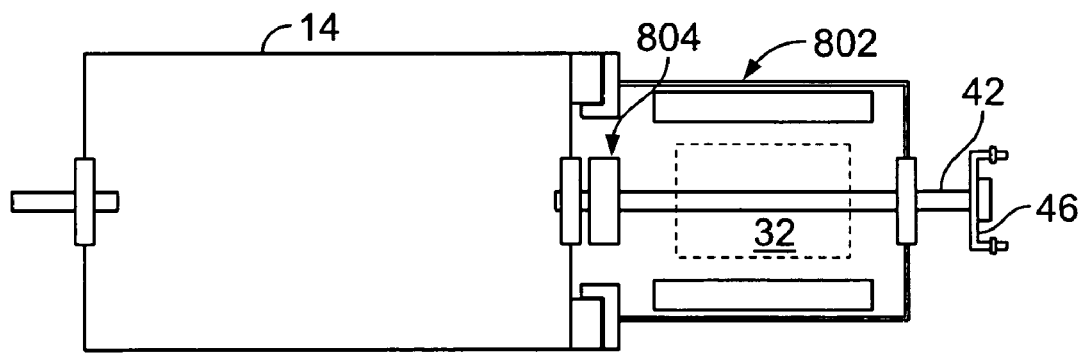
FIG. 11 is a schematic illustration of an exemplary transmission and assembly to be used with the conventional vehicle shown in FIG. 2.

FIG. 10 is a schematic illustration of a prior art transmission and assembly used with a conventional vehicle, and FIG. 11 is a schematic illustration of an exemplary transmission and assembly to be used with the conventional vehicle shown in FIG. 2.

As shown in FIG. 10, in conventional vehicle 10, the first output shaft 42 is coupled between the transmission 14 and the differential 16 using the first and second pair of universal joints 44 and 46 plus first and second drive shafts 40 and 42. A known transmission extension housing 702 is coupled to first output shaft 42 such that housing 702 is coaxial with shaft 42.

As shown in FIG. 11, in the exemplary embodiment of conventional vehicle 10, electrical device 32 is coupled directly to transmission 14 such that no transmission extension housing is necessary. In the exemplary embodiment, electrical device 32 is coupled to transmission 14 using at least one c-face mount 802 including at least one bearing. The bearing is lubricated in the same manner as in a conventional transmission. Moreover, in the exemplary embodiment, electrical device 32 is coupled coaxial with shaft 42 such that shaft 42 extends through rotor 102. In the exemplary embodiment, a tachometer 804 is coupled along shaft 42 and is adjacent to both transmission 14 and electrical device 32.

Figure 12:
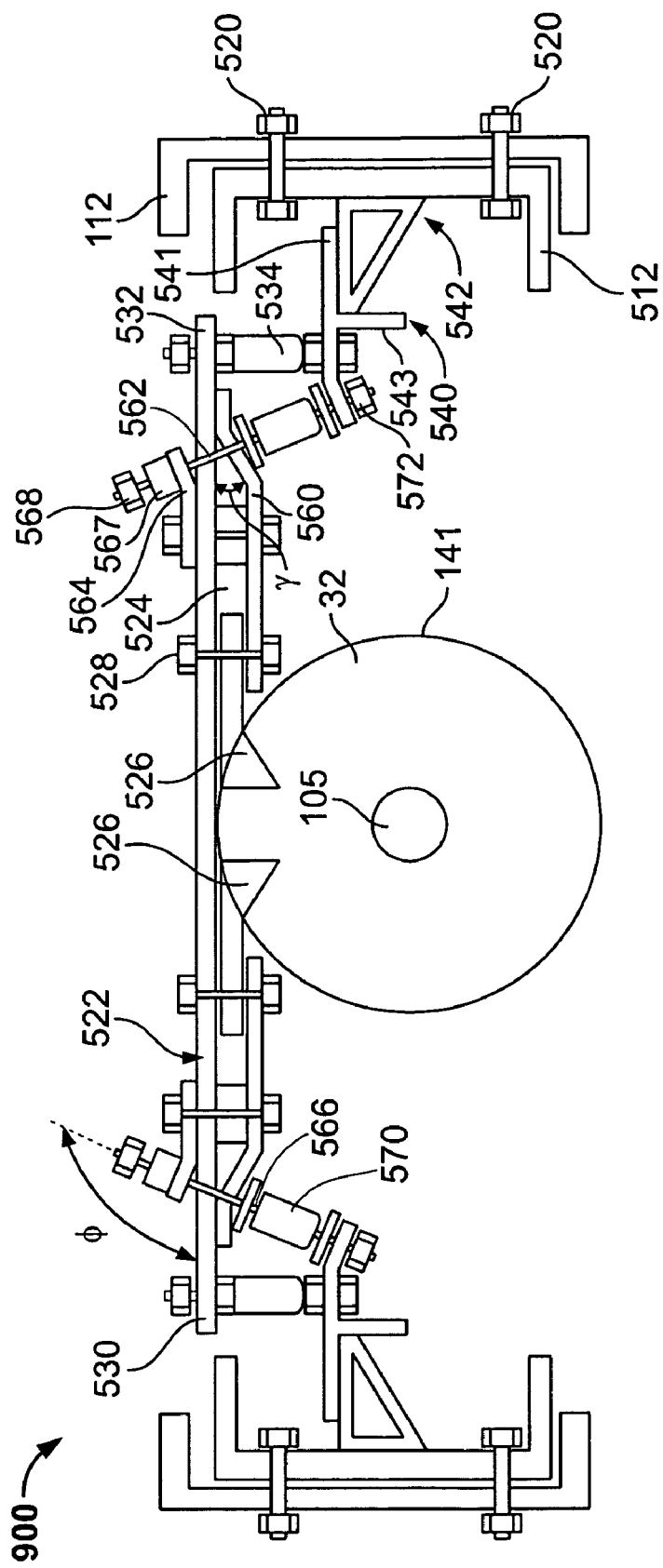
FIG. 12 is an end view of another exemplary sub-frame that may be utilized to mount the electrical device shown in FIG. 2 to the conventional vehicle shown in FIG. 2.

FIG. 12 is another exemplary sub-frame assembly 500 that may be utilized to mount the electrical device 32 shown in FIG. 2 to vehicle 10. FIG. 12 illustrates a sub-frame assembly 900 that is substantially similar to system 500 shown in FIG. 8. As such, numbers used to indicate components in FIG. 8 will be used to indicate the similar component in FIG. 12. In sub-frame assembly 900, motor mounting bracket 522 does not include angular portion 538 extending outward from a portion of mounting bracket 522 at an angle θ, rather motor mounting bracket 522 includes an angular portion 560 extending outward from a portion of motor mounting bracket 522 at angle γ. In the exemplary embodiment, angle γ is an acute angle. Sub-frame assembly 900 further includes a bracket 562 extends through a portion of mounting bracket 522 and angular portion 560. Bracket 562 forms an angle φ with respect to mounting bracket 522. Bracket 562 extends from a first end 564 to as second end 566. First end 564 extends beyond mounting bracket 522, as shown in FIG. 12. A complaint portion 567 is coupled to first end 564 with a fastener 568. A complaint portion 570 is coupled to a second end 566 with a fastener 572. Fastener 572 extends through second portion 541 or restraint 540. Moreover, in the exemplary embodiment, sub-frame assembly 900 does not include longitudinal bearings 548 and 550.

During operation, complaint portions 534, 567, and 570 of sub-frame assembly 900 allow for bi-directional torque and limited longitudinal movement during all modes of operation, for example, during vehicle acceleration and deceleration. Furthermore, compliant portions 534, 567, and 570 minimize damping vibrations caused during operation of vehicle 10 such that audible noise caused by the drive shaft is reduced. Moreover, mounting sub-frame assembly 900 to frame rails 110, 112 compensates for any minimal misalignment between the electrical device 32 and the other components in the drive train that may occur during severe transient torque operation from maximum effort acceleration or panic stop braking events.

In the exemplary embodiment, hybrid system 30 may be retrofitted on a known vehicle to facilitate increasing the performance of the vehicle. For example, to install hybrid system 30 on a known vehicle, at least one drive shaft that is coupled between the transmission and the differential is removed. The electrical device is then coupled between the transmission and the differential such that the electrical motor receives substantially all of the torque generated by the engine and transmission, the transmission output torque is summed with the torque produced by the electric motor and transmitted to the differential in a first operational mode described above, and such that the motor receives substantially all of the torque generated by the vehicle through the differential in a second operational mode.

Described herein is a hybrid vehicle that includes a system including an electrical device such as a motor/generator that is coupled between a vehicle transmission and a differential. The system is capable of operating in at least three modes of operation: Heat Engine Vehicle Operating Mode, where the electric motor drive system is disabled by the VSC; a Hybrid Vehicle Operating Mode, where the VSC enables both the Heat Engine and Electric Drive System; and Zero Emission Vehicle (ZEV), Electric Vehicle Operating Mode, where the VSC either disables the Heat Engine or commands the Heat Engine to be operated at a low power idle mode, commands the transmission to be in a neutral gear, and enables the Electric Drive system to allow the vehicle to operate under reduced performance and over a limited range (limp home mode) using the energy from the energy storage unit.

An additional feature is the commonality of the electric drive system for a smaller vehicle platform all-electric propelled vehicles, i.e. small delivery vehicle or school bus, with a parallel hybrid implementation of larger vehicles (transit bus or large package delivery, beverage delivery vehicles, and refuse trucks).

As such, the system described herein provides improved system efficiency by improving fuel efficiency and reducing emissions compared to other known conventional vehicles. The system may also be retrofitted on existing conventional mechanically driven trucks, buses, or other vehicles. The system provides improved fuel economy and emission reduction from increased round trip efficiency of the electric drive system and higher levels of regenerative brake capture as compared to known hybrid vehicles, primarily due to the elimination of the roundtrip losses through the transmission for the electric drive subsystem, and the implementation cost of the electric drive system, energy storage system, and associated energy management controls is reduced.

While the invention has been described in terms of various specific embodiments, those skilled in the art will recognize that the invention can be practiced with modification within the spirit and scope of the claims.

What is claimed is:

1. A vehicle comprising:
a frame;
a heat engine coupled to said frame;
a transmission including an input and an output;
an electrical device comprising a stator and a rotor, wherein said rotor comprises a rotor shaft having a first end and a second end, said transmission input coupled to said heat engine and said transmission output coupled to said electrical device such that substantially all of the torque generated by said heat engine is channeled through said transmission to said electrical device;
a differential;
a first drive shaft;
a first pair of universal joints that couple said first drive shaft to said rotor shaft first end and said transmission;
a second drive shaft;
a second pair of universal joints that couple said second drive shaft to said rotor shaft second end and said differential; and
a plurality of motor mounts that couple said electrical device to a sub-frame coupled to said vehicle frame, said plurality of motor mounts fabricated at least partially from a compliant material and configured to provide mechanical support for said electrical device to facilitate aligning said electrical device with said first drive shaft, said transmission, said second drive shaft, and said differential.

2. A vehicle in accordance with claim 1 wherein said electrical device is coupled to said differential such that during a first mode of operation said electrical device functions as a motor to receive substantially all the torque generated by said engine through said transmission, and such that during a second mode of operation said electrical device functions as a generator to receive substantially all the torque generated by said differential.

3. A vehicle in accordance with claim 1 wherein said engine comprises at least one of an internal combustion gasoline engine, an internal combustion diesel engine, an external combustion engine, and a gas turbine engine.

4. A vehicle in accordance with claim 1 wherein said transmission comprises an automatically shifting manual transmission.

5. A vehicle in accordance with claim 1 wherein said transmission comprises an automatic transmission including a torque converter coupled between said engine and said automatic transmission.

6. A vehicle in accordance with claim 1 wherein said transmission comprises a manual transmission including a clutch coupled between said engine and said manual transmission.

7. A vehicle in accordance with claim 1 wherein said sub-frame includes at least one reaction torque member that is coupled between said electrical device and at least one frame rail, said reaction torque member configured to transfer bi-directional reaction torque generated by said electrical device to said sub-frame.

8. A vehicle in accordance with claim 1 wherein said frame comprises a first frame rail and a second frame rail that is disposed approximately parallel to said first frame rail, said sub-frame coupled to said first and second frame rails.

9. A vehicle in accordance with claim 1, wherein said electrical device includes at least one endbell, said motor mount is metal and has a substantially U-shaped cross-sectional profile that holds and clamps said compliant material in compression such that at least a portion of said motor mount at least partially circumscribes said endbell assembly to support said electrical device.

10. A vehicle in accordance with claim 1 wherein said electrical device includes a motor frame, said sub-frame further comprises reaction torque members coupled with a plurality of compliant bushings to said motor frame at a plurality of attachment points, said plurality of attachment points are positioned at approximately the 12:00 O'clock, 4:00 O'clock, and 8:00 O'clock positions on said motor frame, said reaction torque members are configured to minimize misalignment.

11. A vehicle in accordance with claim 1 further comprising a mount, said mount has a C-shaped cross-section, said electric device is coupled directly to said transmission with said mount.

12. A vehicle in accordance with claim 11 wherein said mount includes at least one electric motor bearing.

13. A vehicle in accordance with claim 12 further comprising a transmission oil-cooling circuit configured to cool said electrical device.

14. A method of retrofitting a vehicle that includes a vehicle frame, a heat engine, a transmission coupled to the engine, a differential, and at least one drive shaft coupled between the transmission and the differential, said method comprising:

removing the at least one drive shaft;
coupling an electrical device between the transmission and the differential such that during a first mode of operation the electrical device functions as a motor to receive substantially all the torque generated by the engine through the transmission, and such that during a second mode of operation the electrical device functions as a generator to receive substantially all the torque generated by the differential, the electrical device including a stator and a rotor, wherein the rotor includes a rotor shaft having a first end and a second end;
coupling a first drive shaft to the rotor shaft first end and to the transmission using a first pair of universal joints;
coupling a second drive shaft to the rotor shaft second end and to the differential using a second pair of universal joints; and
coupling a plurality of motor mounts to a sub-frame coupled to the vehicle frame, the plurality of motor mounts fabricated at least partially from a compliant material and configured to provide mechanical support for the electrical device to facilitate aligning the electrical device with the first drive shaft, the transmission, the second drive shaft, and the differential.

15. A method in accordance with claim 14 wherein said removing the at least one drive shaft further comprises:
reinstalling the first drive shaft and the second drive shaft having a combined length that is less than a length of the at least one drive shaft such that the electrical device is coupled between transmission and the differential.

16. A method in accordance with claim 14 further comprising:
coupling a control system coupled to the electrical device, the control system including an energy storage system and a vehicle system control (VSC) such that the vehicle control system is coupled to the electrical device and the energy storage system, and such that the vehicle system control system is configured to operate the vehicle in at least one of a heat engine vehicle operating mode, a hybrid vehicle operating mode, and an electric vehicle operating mode.

17. A method in accordance with claim 16 wherein the energy storage system includes at least one battery and at least one ultracapacitor, said method further comprising coupling a precharge and interface circuit between the at least one battery and the at least one ultracapacitor such that channel energy is channeled from the ultracapacitor to the electrical device in the first mode of operation, and such that energy is channeled from the electrical device to the ultracapacitor in the second mode of operation.

18. A method in accordance with claim 17 further comprising coupling the electrical device to the second drive shaft utilizing at least one of a fixed ratio gear assembly, a chain drive, or a belt drive, such that the electrical device is operable at a relatively high speed and at a relatively low torque.

* * * * *